(12) United States Patent
Tselev et al.

(10) Patent No.: US 12,474,369 B2
(45) Date of Patent: Nov. 18, 2025

(54) HYBRID NEAR-FIELD SCANNING MICROWAVE MICROSCOPE

(71) Applicant: UNIVERSIDADE DE AVEIRO, Aveiro (PT)

(72) Inventors: Alexander Tselev, Aveiro (PT); Nikolai Vyshatko, Aveiro (PT); Luis Manuel Santos Da Rocha Cupido, Aveiro (PT)

(73) Assignee: UNIVERSIDADE DE AVEIRO, Aveiro (PT)

( * ) Notice: Subject to any disclaimer, the term of this patent is extended or adjusted under 35 U.S.C. 154(b) by 0 days.

(21) Appl. No.: 18/878,214

(22) PCT Filed: Jun. 28, 2022

(86) PCT No.: PCT/IB2022/055997
§ 371 (c)(1),
(2) Date: Dec. 23, 2024

(87) PCT Pub. No.: WO2023/248000
PCT Pub. Date: Dec. 28, 2023

(65) Prior Publication Data
US 2025/0271465 A1    Aug. 28, 2025

(30) Foreign Application Priority Data
Jun. 22, 2022  (PT) ........................................ 118063

(51) Int. Cl.
*G01Q 10/06*       (2010.01)
*G01Q 20/02*       (2010.01)
*G01Q 60/00*       (2010.01)

(52) U.S. Cl.
CPC ............. *G01Q 10/06* (2013.01); *G01Q 20/02* (2013.01); *G01Q 60/00* (2013.01)

(58) Field of Classification Search
CPC ......... G01Q 10/06; G01Q 20/02; G01Q 60/00
See application file for complete search history.

(56) References Cited

U.S. PATENT DOCUMENTS

| 7,190,175 | B1 | 3/2007 | Kelly et al. | |
| 2004/0196037 | A1* | 10/2004 | Xiang | G01N 24/10 |
| | | | | 324/300 |

(Continued)

OTHER PUBLICATIONS

International Search Report for PCT/IB2022/055997 Mailed on Mar. 29, 2023.

(Continued)

*Primary Examiner* — Nicole M Ippolito
(74) *Attorney, Agent, or Firm* — Rivka Friedman

(57) ABSTRACT

The invention describes a scanning probe imaging system with the probe held at a small distance from a sample (7) surface of the part during raster-scanning image acquisition. The interaction between the sample (7) and the probe's cantilever arm (17') is achieved due to microwave near fields formed at the sharp probe tip (18). Due to the near fields, the electrical impedance of the probe depends on the distance between the probe and the sample (7) and on the sample electrical properties, both in the immediate vicinity of the probe tip (18). The microwave detection system senses the electrical impedance of the probe at a set microwave frequency. The probe-sample distance is set and controlled with the use of an optical chromatic confocal displacement sensor as well as with the signals of the microwave detection system.

22 Claims, 4 Drawing Sheets

(56) References Cited

U.S. PATENT DOCUMENTS

| | | | |
|---|---|---|---|
| 2013/0066597 A1* | 3/2013 | Van Beurden | G03F 7/705 |
| | | | 702/81 |
| 2021/0270916 A1* | 9/2021 | Szalai | G01R 33/60 |
| 2021/0348288 A1 | 11/2021 | Eliyahu et al. | |
| 2024/0280606 A1* | 8/2024 | Koguchi | G01Q 70/10 |

OTHER PUBLICATIONS

Anonymous: "Chromatic Confocal Sensor Working Principle : Deep Study", Jan. 1, 2023, XP09329101 URL: https://www.geramtech.com/chromatic-confocal-sensor-working-principle/.

* cited by examiner

HYBRID NEAR-FIELD SCANNING MICROWAVE MICROSCOPE

TECHNICAL FIELD

The present invention is enclosed in the field of scanning probe imaging systems.

PRIOR ART

Development of nanotechnology leads to growth of the variety of functional devices and manufacturing techniques that are scaled to mass or small-series production. The devices may include system-on-a-ship, lab-on-a-chip, micro- and nano-electro-mechanical systems, components of system-on-a-chip devices, and others. This demands tools for control of manufacturing process and product quality in-line with sub-micrometer spatial resolution. Tools that provide images of part surfaces are of a highest importance, as can be understood with an example of optical images. With the use of optical microscopy systems, one can obtain metrological information on the geometry of features along the surface of parts under inspection due to variations of topography (surface geometry in the direction perpendicular to the surface) and/or variations of material physical properties along the surface, such as, for example, film thickness, electrical properties, and surface roughness.

Imaging resolution of systems based on far-field optical microscopes and similar instruments is limited by the light diffraction phenomenon with the best possible resolution of a few hundreds of nanometers. In practical optical microscopy systems currently used for in-line quality control during manufacturing processes, this limit is not achieved, and the specified resolution is close to 2 µm at best. One of the approaches to overcome the diffraction limit is the use of near-field techniques, which are unrestricted by the wave diffraction, and based on radiation wavelength much larger than those of the light, for microwaves, which are broadly understood as electromagnetic waves with frequencies between 100 MHz and 500 GHz. Near-field techniques utilize near-fields formed in the vicinity of a probing structure—a probe—with motions of the probing structure relative to the sample under study, making measurements point-by-point. The resolution of the imaging is determined by the geometry and dimensions of the probing structure as well as the distance between the probing structure and the sample surface, and the probing structures are realized most frequently as sharp tips, that are most frequently brought into contact with the sample surface in order to acquire an image. The need to keep the probe tip in contact with the sample surface during imaging limits both the imaging rate, especially for surfaces with significantly varying topography, like a system of channels in a matrix, and the useful life of the probe due to the probe wear. This is very unfavorable for use in the quality control systems, especially in-line ones, where, for example, the obtained images of parts under examination need to be compared with an image of an etalon part. The probe wear will lead to a low fidelity of the part inspection.

Several different methods are known to control the probe-sample distance in the near-field microwave microscopy, and a few of them are focused on the distance control with a gap between the probe and sample. Publication [1] teaches a tip-sample control system utilizing the tunnelling current between the tip and the sample. While working out-of-contact with the sample, it can be applied only for samples that are good electrical conductors. U.S. Pat. No. 6,614,227B2, WO9916102A1 and U.S. Pat. No. 8,266,718B2 teach near-field microwave microscopes with the use of the microwave signal for control of the sample-probe distance, where one and the same probe is used for imaging and distance control by tracking the microwave response from the probe. Patent application WO2004088669A1 teaches a microwave near-field microscope with a dedicated mechanical probe for controlling the probe-sample distance. U.S. Pat. No. 7,190,175B1 uses a probe with two combined near-field microwave sensors (i.e., electrodes) on the same probe—one for imaging and one that can be used for distance control by tracking the microwave response from it.

Other known systems use optical lever, similar to conventional atomic force microscopes, or tuning fork-based systems. They can be utilized only to keep the near-field microwave probe in contact with the sample surface. U.S. Pat. No. 6,597,185B1 teaches a system, where the probe-sample distance is controlled with the use of the shear force, with the probe remaining in contact with the sample under study. It also mentions methods including optical fibers and laser beams for an out-of-contact probe operation.

The present disclosure describes a solution intended to innovatively overcome the issues outlined above, by introducing a hybrid near-field scanning microwave microscope and respective method to control the probe-sample distance, which can be applied in quality-control in-line measurement with the probe out-of-contact with a sample.

SUMMARY OF THE DISCLOSURE relates to a near-field microwave scanning probe imager (scanning probe microscope), which operates with the probe in the close proximity to the surface of the sample being imaged during the image acquisition or mapping of sample properties.

One aspect of the present disclosure is the implementation of an optical chromatic confocal displacement (distance) sensor to control the probe-sample separation. The probe of the microscope is L-shaped with a sharp end positioned at the sample surface. The probe terminates the signal conductor of a planar waveguide, and the probe and the microwave detection circuit elements are made within a single mechanical assembly.

In a preferred embodiment of the microscope developed, it comprises:
  a control and signal acquisition unit;
  a sample motion stage;
  a microwave probe holder assembly comprising at least a probe; the probe having a tip with a sharp apex positioned in a near vicinity of the sample surface;
  an optical chromatic confocal displacement sensor, having an aperture and being positioned with its optical axis along a plane normal to the plane of the sample surface; wherein, the sensor comprises:
  an optical unit adapted to focus a light spot of different wavelengths at different positions along its optical axis, simultaneously on a portion of the probe and on a portion of the sample surface; and
  a spectrometer unit adapted to measure the intensity of the spot light reflection signal as a function of the light wavelength; such intensity signal yielding a peaked intensity of light at a sensor position along the optical axis for each reflecting surface, that is, corresponding to the distance between the sensor aperture and the probe, $Z_p$, and to the distance between the sensor aperture and the sample surface, $Z_s$; and wherein, the control and signal acquisition unit comprising processing means configured to position and monitor the position of the probe tip at a predefined distance, $A=Z_p-Z_s$, from the sample surface, based on a tip length and the distance values $Z_p$ and $Z_s$.

The present disclosure also provides a method for probe-sample distance control using a confocal chromatic displacement sensor, which enables non-contact and high-resolution images of topography (height maps) or electrical characteristics of a planar sample.

In a preferred embodiment of the method, it comprises the following steps:
i. scanning a confocal sensor over a cantilever arm and a sample surface, to determine an optimal position for the sensor, in which an optical axis of the sensor intercepts both a portion of the cantilever arm and a portion of the sample surface;
ii. actuating the sensor to focus a light spot of different wavelengths at different positions along the optical axis of the sensor;
iii. measuring the intensity of the light reflected from both the surfaces of the cantilever arm and the sample, by the sensor, as a function of the light wavelength, in order to determine an intensity peak for each reflected signal;
iv. modeling the peak, corresponding to a maximum of a sample peak, using a modeling function in order to obtain a function $F_s(z)$ and to determine at least one modeling parameter relating to a distance $Z_s$ corresponding to a distance between the sample surface and the confocal sensor aperture;
v. modeling the peak, corresponding to a maximum of a cantilever arm peak, using a modeling function in order to obtain a function $F_p(z)$ and to determine at least one modeling parameter relating to a distance $Z_p$ corresponding to a distance between the cantilever arm and the sensor aperture;
vi. moving the probe holder assembly towards the sample surface and simultaneously modeling a full sensor intensity signal with a sum of functions $F_s(z)$ and $F_p(z)$, wherein the parameters of function $F_s(z)$, $Z_s$, are fixed and the parameters of function $F_p(z)$, $Z_p$, vary in order to achieve the predetermined distance, A, between the sample surface and the cantilever arm, during the assembly motion, wherein $A=Z_p-Z_s$;
vii. stopping the assembly motion at the predefined value of difference A.

A key distinction of the microscope of the present disclosure from other analogous microscopes is that its probe is not brought into contact with the sample but remains out of contact during scanning in a single plane, which is fixed in the laboratory coordinate system (and can be referenced, for example, to the microscope mechanical base, as shown in FIG. 1). The scanning plane is positioned in a proximity to the sample surface. This arrangement makes the microscope most suitable for visualizing topographic details of sample along the sample surface (projected onto the sample surface) through the near-field microwave signal, especially for samples with artificially created topographic patterns, like systems of channels made in a single material. It can be also utilized for mapping artificially created planar patterns with features significantly differing in one or more electrical properties, such as conductivity and dielectric constant, as can be exemplified by patterns of metallic leads in insulating matrixes like interconnect structures in integrated circuits.

Positioning the probe in the vicinity of the sample surface rather than maintaining a contact with the sample surface during scanning does not require a feedback system to maintain the probe in contact with the sample surface, which allows fast scanning rates and short map acquisition times. This feature can be especially useful for in-line monitoring and quality control tasks during manufacturing processes where parts under tests can be compared with an etalon (reference) part. It can be also used, for example, for fault detection and localization in interconnect systems of integrated circuits, to name a few potential applications.

The confocal sensor can be used to probe the part or sample surface geometry roughly. The lateral spatial resolution that can be obtained with the confocal sensor is generally significantly poorer than that which can be obtained with a scanning near-field probe. However, the measurement of the height of the surface topography (that is, along the surface normal) is routinely at or below 100 nm. The surface probing with the confocal sensor before engaging the microwave scanning probe can be used to inspect the surface for major defects and protruding parts that may adversely affect the imaging with the near-field probe up to damaging the probe if it collides with a protruding imperfection.

DETAILED DESCRIPTION

The present disclosure relates to a scanning probe microscope utilizing microwave near-fields to map electrical properties of samples.

Figure 1:
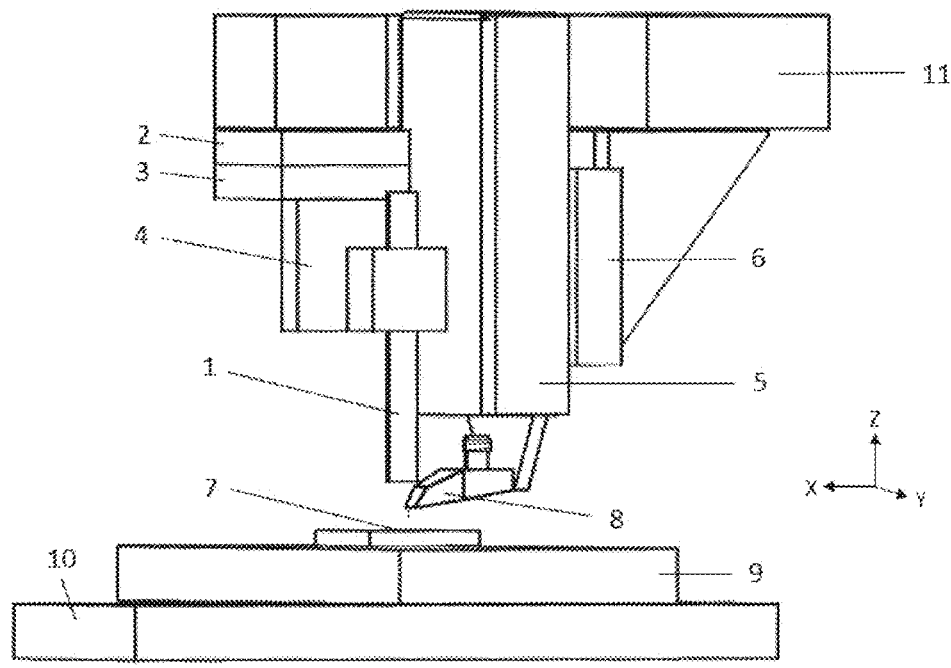
FIG. 1 is a schematic of the layout of an embodiment of the microscope of the present disclosure. The reference marks represent: (1)—optical chromatic confocal displacement sensor; (2), (3), (4), (6), (9), (10)—linear translation stages; (5)—reflectometer; (7)—sample; (8)—probe holder assembly; (11)—microscope frame.

One embodiment of the microscope of the present disclosure is illustrated in FIG. 1. The basic design of the microscope comprises a microwave probe holder assembly (8), a microwave reflectometer (5), an optical chromatic confocal displacement sensor (1), and linear translation stages (2), (3), (4), (6), (9), and (10). The linear stages (2) and (6) are attached to the frame (11). The probe holder assembly (8) is firmly attached to the reflectometer (5). The reflectometer (5) is attached to the linear stage (6) that is used to move the reflectometer (5) with the probe holder assembly (8) in a plane normal to the sample's plane (i.e., Z axis or vertical direction). The confocal sensor (1) is positioned with its optical axis parallel to the Z axis and facing the sample (7) with its aperture and attached to the set of the linear stages (2), (3), and (4) that are used to move the confocal sensor (1) along a plane parallel to the sample's plane (i.e., X and Y axes) and along Z axis, respectively. Stages (9) and (10) are used to move the sample (7) along the X and Y directions. The sample (7) is positioned so that its surface is parallel to the XY plane, i.e., horizontal plane or a plane parallel to the sample's plane.

Figure 2:
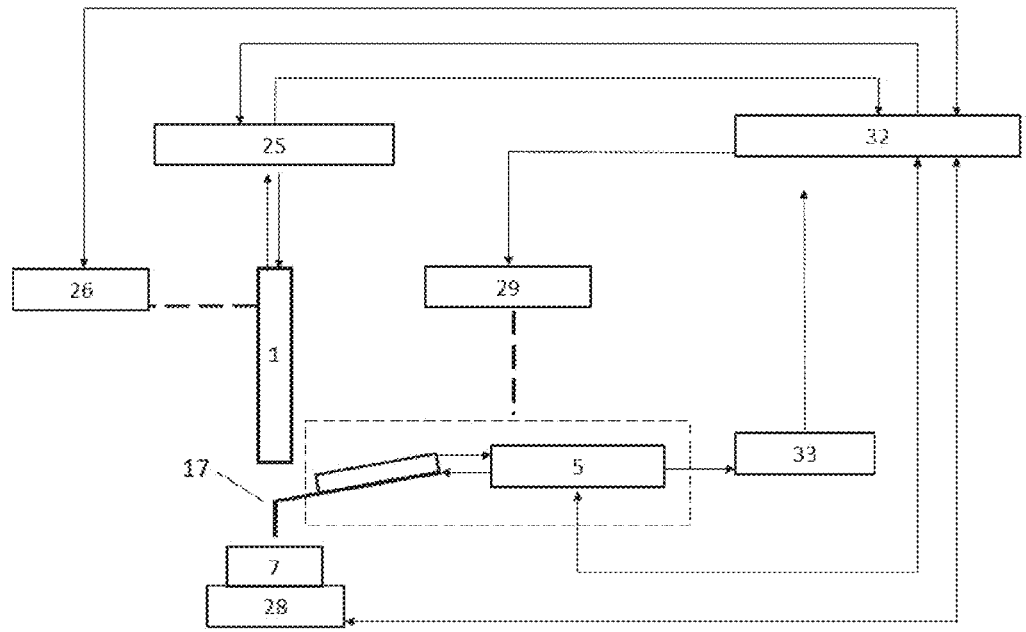
FIG. 2 is a signal and control command flow diagram in an embodiment of the microscope of the present disclosure. The reference marks represent: (1)—confocal sensor; (5)—reflectometer; (7)—sample; (17)—probe; (25)—confocal sensor controller; (26), (28), (29)—positioners; (32)—control and signal acquisition unit; (33)—signal processing unit.

FIG. 2 illustrates a data and control signal flow chart of an embodiment of the microscope system disclosed in the present application. The microscope system is controlled by a control and signal acquisition unit (32), that executes all the control and synchronization functions, collects the signals in the digital form, and formats the visual representation of the measurement and mapping results (to display plots, maps, and images). The control and signal acquisition unit (32) may receive measurement data from a controller (25) of the confocal sensor (1) and from a signal processing unit (33) that conditions and digitizes analogue output signals of a microwave reflectometer (5). The reflectometer (5) interrogates the microwave reflection coefficient from a microwave probe (17) (installed in the probe holder assembly (8) (FIG. 1)). The controller (25) optically interrogates the confocal sensor (1). Translations of the sample (7), confocal sensor (1), and the reflectometer (5) with the probe assembly (8) are performed with positioners (28), (26), and (29), respectively, which are combinations of translation stages and controllers associated with them. The functional parameters and instrument states of the reflectometer (5), confocal sensor controller (25), and positioners (26), (28) and (29) are set and controlled via the control and signal acquisition unit (32).

Figure 3:
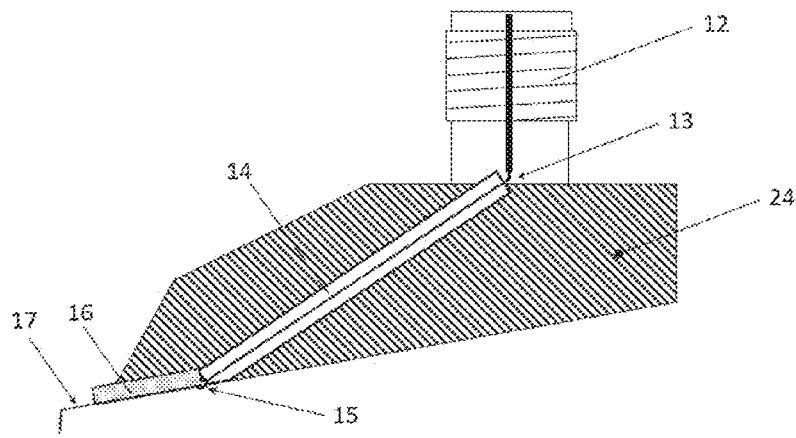
FIG. 3 is a cross-sectional view of an embodiment of the probe holder assembly (8) along the vertical, XZ, plane containing the probe (17) axis. The reference marks represent: (12)—coaxial connector; (13)—impedance matching element; (14)—air-filed coaxial waveguide; (15)—wire bonding; (16)—substrate; (17)—probe; (24)—body.

FIG. 3 shows a drawing of the probe holder assembly (8). The assembly comprises a body (24), a coaxial (e.g., SMA-type) connector (12), an air-filed coaxial waveguide (14) inserted into the body (24), and a probe (17) attached to a substrate (16). The substrate (16) is fixed in the holder body (24). The probe (17) is electrically connected to the central conductor of the coaxial waveguide (14) with a wire bond (15). At its opposite end, the signal conductor of the coaxial waveguide (14) is electrically coupled to the central conductor of the coaxial connector (12) with an impedance matching element (13). The element (13) electrically continues the central conductor of the coaxial connector (12). Element (13) can be made of a metal flapper-type spring making a gap with the corresponding end of the coaxial waveguide (14) to provide capacitive coupling between the end of the central conductor of the coaxial connector (12) and the central conductor of the coaxial waveguide (14). Alternatively, the element (13) can be electrically continuous (firmly contacted) with the central conductor of the coaxial waveguide (14).

Figure 4:
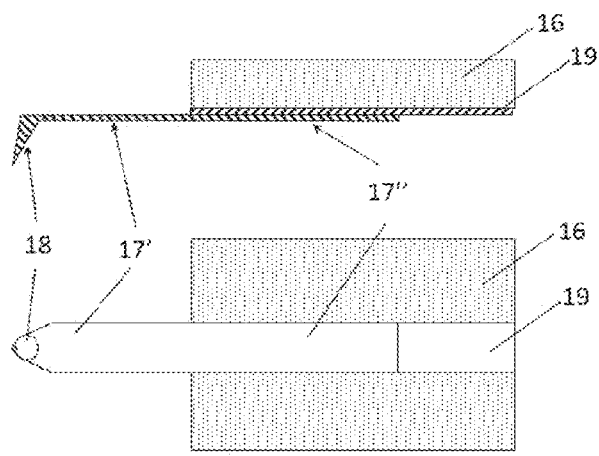
FIG. 4 is the side and bottom views of an embodiment of the probe (17) on a substrate (16). The reference marks represent: (16)—substrate; (17') probe's cantilever arm first portion; (17")—probe's cantilever arm second portion; (18)—tip of the probe; (19)—signal conductor.

FIG. 4 illustrates side and bottom views of the probe (17) on a dielectric substrate (16) with a microstrip transmission line formed on it. The probe (17) is made of a solid metal and is L-shaped, comprising of a cantilever arm (17') with a tip (18) at the arm's distal end. The cantilever arm continues with the portion (17") over the substrate (16) and is connected along its substrate part to the signal conductor (19) of a microstrip transmission line structure on the substrate (16). The tip (18) and the cantilever arm (17') make one electrically conducting body. The wave impedance of the microstrip transmission line formed on the probe substrate (16) closely matches the wave impedance of the coaxial waveguide (14), which, in turn, closely matches the wave impedance—usually 50 Ohm—of the feed line connecting the coaxial connector (12) with the reflectometer (5) (not shown in FIG. 1).

The mapping signal formation principle of a microwave near-field microscope is based on the change in the electrical impedance of the probe (17) due to the presence of a sample (7) in the immediate vicinity of the probe (17). This impedance depends on the distance between the probe tip (18) and the sample (7) surface and on the electrical properties of the sample (7) material in the immediate vicinity of the probe tip (18)—dielectric permittivity as well as dielectric loss and/or electrical conductivity. The probe (17) impedance is interrogated by measuring the microwave reflection coefficient either: (i) at the element (13), if the element (13) is configured to provide capacitive coupling between the element (13) and the central conductor of the coaxial waveguide (14); or (ii) at the probe (17) if the element (13) is firmly in electrical contact with the central conductor of the coaxial waveguide (14). The reflection coefficient is measured with the help of the reflectometer (5). In the first case, the coaxial waveguide (14) and the microstrip line on the substrate (16) with the probe (17) make up a transmission line resonator, which is capacitively coupled to the feed line from the reflectometer with the help of the element (13).

Figure 5:
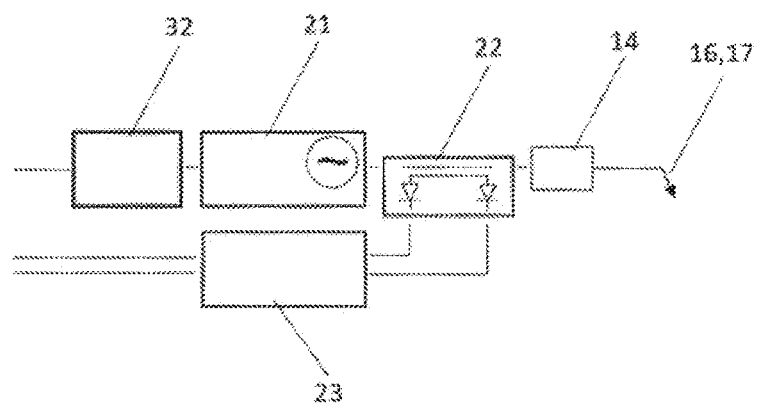
FIG. 5 is a block-diagram of an embodiment of a reflectometer electrical circuit (for the homodyne version of the reflectometer). The reference marks represent: (14)—coaxial waveguide; (16)—substrate; (17)—probe; (21)—synthesized microwave source; (22)—coupler; (23)—receiver; (32)—control and signal acquisition unit.
Figure 6:
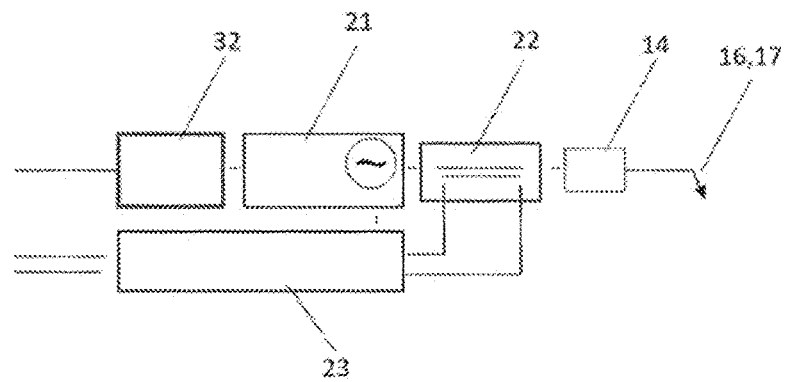
FIG. 6 is a block-diagram another embodiment of a reflectometer electrical circuit (for the heterodyne (coherent) version of the reflectometer). The reference marks represent: (14)—coaxial waveguide; (16)—substrate; (17)—probe; (21)—synthesized microwave source; (22)—coupler; (23)—receiver; (32)—control and signal acquisition unit.

The reflectometer (5) can be realized in two versions: homodyne and heterodyne. FIGS. 5 and 6 show schematic functional block diagrams of the homodyne and heterodyne versions of the reflectometer (5), respectively. Both the versions comprise a synthesized microwave source (21) that generates the probing microwave, a coupler (22) that can sample the forward and the reflected waves, and a receiver (23). In the homodyne version, the receiver (23) detects only the magnitudes of the forward and reflected microwaves in order to measure the magnitude of the reflection coefficient. In the heterodyne version, the receiver is capable of detecting amplitudes and phases of the forward and reflected microwaves to determine the magnitude and phase of the reflection coefficient. The receiver (23) also provides the measurement signals to an external data acquisition system and accepts configuration and operation commands from the control and signal acquisition unit (32).

The reflection coefficient from the resonator formed by the probe (17), stripline on the substrate (16), and the coaxial waveguide (14) is a strong function of frequency near the frequencies of the resonance modes of the resonator. The working frequency of the microscope is fixed during acquisition of an image and selected differently for the heterodyne and homodyne versions of the reflectometer (5). Since the reflectometer (5) in its homodyne version is sensitive only to the magnitude of the reflection coefficient, the working frequency is selected at the maximum of derivative of the magnitude of the reflection coefficient as a function of frequency. Such frequency choice optimizes the measurement sensitivity in the respect to the magnitude. In turn, the heterodyne reflectometer (5) detects both the magnitude and phase, and the working frequency is selected near the resonant frequency of a resonant mode. Such a condition provides the best match of the probe impedance with the impedance of the feed line. With the impedances closely matched, the measurements sensitivity is optimized in respect to the magnitude and phase of the reflection coefficient combined.

In the microscope herein disclosed, the sharp apex of the tip (18) is positioned during imaging in the close proximity to the surface of the sample (7) with a small gap between the tip (18) apex and the sample (7). To measure and control the gap size (tip-sample distance), the confocal sensor (1) is used. An optical unit of the sensor (1) focuses light of different wavelengths at different positions (distances) along its optical axis. The sensor (1) employs a polychromatic (white) light source to illuminate the sample through its optical unit and a spectrometer unit to measure the intensity of the light reflected from the sample back through the sensor's optical unit as a function of the light wavelength. Reflection of the light from a surface positioned at a distance from the sensor's aperture yields a peaked (much larger) intensity of the light with the wavelength that is focused at the surface position and, therefore, corresponding to the distance between the reflecting surface and the confocal sensor (1) aperture. If two reflecting surfaces are present at the light path of the sensor (1), the reflected light spectrum will show two intensity peaks vs. light wavelength, corresponding to the distances of the respected surfaces to the sensor (1) aperture, and so on. The analysis of the spectrum of the reflected light allows one to determine surface displacement and distances between surfaces with an accuracy of tens of nanometers.

Figure 7:
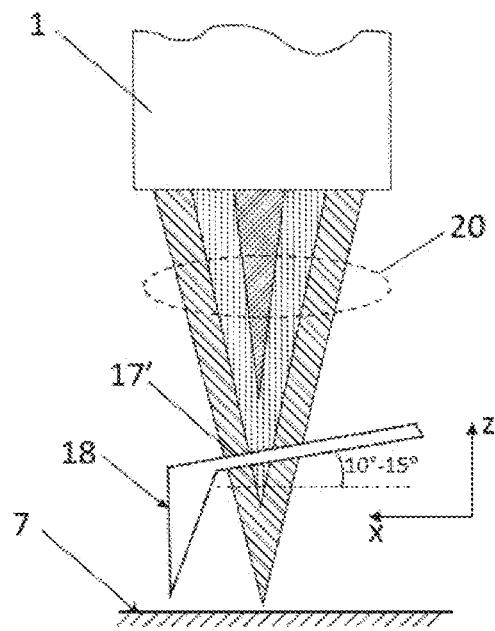
FIG. 7 is a schematic of the arrangement of an embodiment of the cantilever probe and the optical chromatic confocal displacement sensor. The reference marks represent: (1)—confocal sensor; (7)—sample; (17')—cantilever arm first portion; (18)—tip of the probe; (20)—light spot from the confocal sensor.

In the microscope of the present application, the optical confocal chromatic displacement sensor (1) is positioned with its optical axis along the normal to the surface of the sample (7) to measure and monitor the distance between the cantilever arm (17') of the probe and the surface of the sample (7) as illustrated in FIG. 7. The probe cantilever arm (17') makes an angle in the range of 10-15 degrees with the sample (7) surface. The angle between the cantilever arm (17') and the probe tip (18) is adjusted to facilitate the optical distance measurements with the confocal sensor (1) so that the tip (18) axis is approximately normal to the sample (7) surface. The length of the probe tip (18) is sufficiently long, in the range of 100-150 µm, so that the peaks corresponding to the surfaces of the sample (7) and cantilever arm (17') are well-separated in the output spectrum of the confocal sensor (1).

Figure 8:
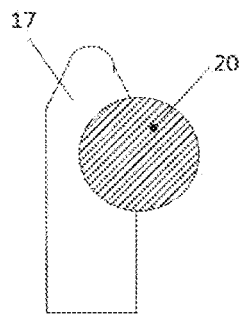
FIG. 8 is a schematic of the placement of the light spot from the confocal sensor on the top of the probe cantilever arm in the embodiment of the microscope of the present disclosure. The reference marks represent: (17)—probe; (20)—light spot from the confocal sensor.

The confocal sensor (1) can be moved along the sample (7) plane (X and Y axes) and along the sample plane normal (Z axis) with a set of three linear translation stages (2), (3), and (4). In turn, the mechanical assembly formed by the probe holder assembly (8), the transmission-line structure and the reflectometer (5) can be moved along the sample plane normal (Z axis) with the linear translation stage (6). Therefore, the distance between the sample (7) surface and the confocal sensor (1) aperture as well as between the sample (7) surface and the cantilever probe tip (18) can be changed and fine-tuned with the use of the corresponding Z-axis translation stages ((4) and (6)). The translation stages (2) and (3) are used to position the confocal sensor (1) in respect to the probe cantilever arm (17') so that the incident light (20) from the confocal sensor (1) is divided approximately equally between the cantilever arm (17') and the sample (7) surface as illustrated in FIG. 8. It is apparent from this arrangement that the confocal sensor (1) can be placed along the XY plane so that no light from the sensor (1) hits the probe cantilever arm (17'). In this case, the confocal sensor (1) can be used alone to probe the sample (7) surface, for example, for a preliminary sample (7) surface inspection to verify surface flatness and purity before the probe (17) is engaged. It is also clear that both the confocal sensor (1) and the probe (17) can be used simultaneously to probe the sample properties. To obtain the map (shape) of the sample (7) surface, the sample (7) is moved in a raster-scanning motion with the use of the linear stages (9) and (10).

With knowledge of the probe tip (18) length, the probe tip (18) can be positioned at a defined distance from the sample (7) surface with the help of the signals from the confocal sensor (1). The algorithm of setting the distance between the cantilever probe tip (18) and sample (7) surface without the Z-motion of the sample (7) includes:

1. Lifting the cantilever arm (17') of the probe (17) to a sufficient height with the use of the linear stage (6) so that the sample (7) surface is below the probe tip (18) with a relatively large tip-sample gap (e.g., 1 mm);
2. Fixing a distance between the confocal sensor (1) aperture and sample (7) surface within the working distance range of the confocal sensor (1) by moving the sensor (1) along the plane normal to the sample's plane (Z-direction) with the linear stage (4).
3. Moving the confocal sensor (1) with linear stages (2) and/or (3) to introduce the cantilever arm (17') into the optical axis of the light spot (20) of the confocal sensor (1).
4. Moving the cantilever arm (17') with the linear stage (6) down to the sample (7) surface to a distance between tip (18) and sample (7) larger than, for example, 100 µm and smaller than, for example, 300 µm. This can be done, for example, by observing the probe tip (18) and sample (7) surface in an auxiliary optical microscope or after preliminary measurements of the sample (7) surface position in the laboratory reference system with other means. These means may include a separate calibrated height (Z) position sensor or the confocal sensor (1) after calibrating the position of its aperture in respect to a reference surface, for example, of the upper (or another suitable) surface of the sample linear translation stage (9), the Z-position of which is fixed.

5. Scanning the confocal sensor (1) over the cantilever arm (17') with the use of linear stages (2) and (3) to determine the optimal position of the sensor (1) above the cantilever arm (17'). At the optimal position, the light spot (20) from the sensor (1) should be positioned approximately as indicated in FIG. 8:
   (i) The spot position is close to the distal end of the cantilever arm (17');
   (ii) Only a part of the light spot focuses the cantilever arm (17'); the other part of the light from the sensor (1) passes the cantilever arm (17') and reaches the sample (7) surface. In this way, the distance to the cantilever arm (17') and to the sample surface can be measured by the sensor (1) simultaneously.

Figure 9:
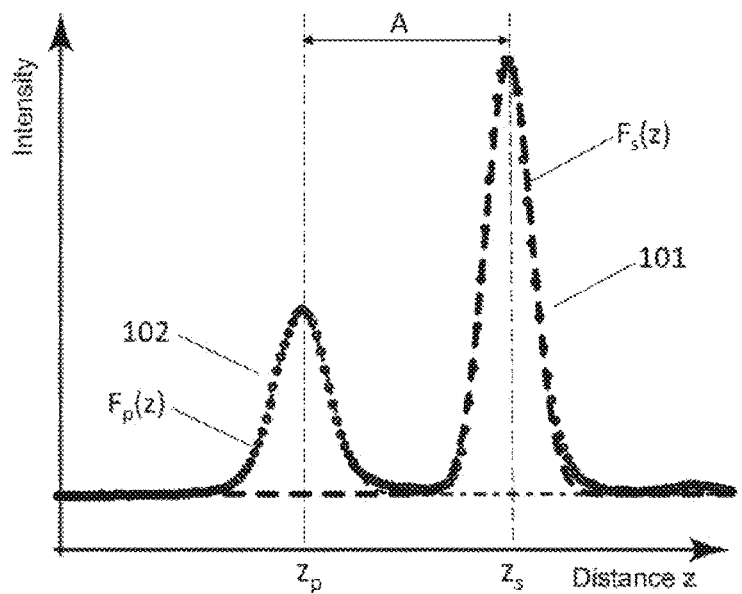
FIG. 9 is the typical signal from the optical chromatic confocal displacement sensor with peaks from the probe cantilever arm and sample surface. The reference marks represent: (101)—intensity peak corresponding to the sample reflection signal collected at the confocal sensor; (102)—intensity peak corresponding to the probe reflection signal collected at the confocal sensor.

This step is monitored by observing the peak (102) that corresponds to the cantilever arm (17') in the signal from the confocal sensor (1) (FIG. 9). It is assumed that the peak (101) from the sample (7) surfaces always present in the sensor signal at this step.

6. Obtaining the digital representation of the video signal of the confocal sensor (1) (i.e., the sensor intensity signal as a function of distance, z, as in FIG. 9, which is provided or can be obtained programmatically from the confocal sensor controller (25) and mathematically fitting or modeling in another way the obtained signal in a range near the maximum of the sample surface peak (101) with a suitable mathematical function (e.g., Lorentzian or Gauss function) as denoted with the thick dashed line in FIG. 9. The fitting parameters are determined and fixed. The resulting function is called $F_s(z)$. One of the fitting parameters is the distance $Z_s$ corresponding to the position of the sample (7) surface in respect to the confocal sensor (1) aperture and simultaneously to the position of the maximum of the function $F_s(z)$ (that is, the maximum of peak (101)).

7. Fitting or modeling the peak (102) corresponding to the probe cantilever arm (17') with a mathematical function similar to the peak (101) at step 6. The resulting function is $F_p(z)$ (dashed-dotted line in FIG. 9). One of the fitting parameters is the distance $Z_p$ corresponding to the position of the probe (17) cantilever arm in respect to the sensor (1) aperture.

8. Moving the probe (probe holder assembly (8)) towards the sample (7) surface with the help of the linear stage (6) and simultaneously fitting/modeling the full video signal of the sensor (1) with the sum $F_s(z)+F_p(z)$ with parameters of the function $F_s(z)$ determined at step 6 and fixed, and parameters of the function $F_p(z)$ varying to achieve the best fit of the varying video signal during the probe (17) motion. The resulting difference $A=(Z_p-Z_s)$ is the distance between the sample (7) surface and cantilever arm (17'). Since the length of the probe tip (18) is large enough (for example, close to 100 µm), the peaks in the video signal of the sensor (1) corresponding to the sample (7) surface and the cantilever arm (17') remain well-resolved, which ensures the reliability of the peak fitting/modeling procedure.

9. Stopping the probe motion at a predetermined value of the difference $A=(Z_p-Z_s)$.

As a variant of the algorithm, in step 8, the sensor (1) can be moved simultaneously and identically with the motion of the probe holder assembly (8) towards the sample (7) surface. In this case, the parameters of the function $F_p(z)$ can be determined in step 7 and fixed, and parameters of the function $F_s(z)$ can be found through the fitting procedure during the probe (17) motion as in step 8.

As a variant, the maximum positions of the peaks (101) and (102) can be obtained separately, rather than with use of the sum $F_s(z)+F_p(z)$, as well with other mathematical techniques (for example, Center of Gravity (COG) Method, Polynomial Regression), rather than fitting, to obtain the distance $A=(Z_p-Z_s)$.

Figure 10:
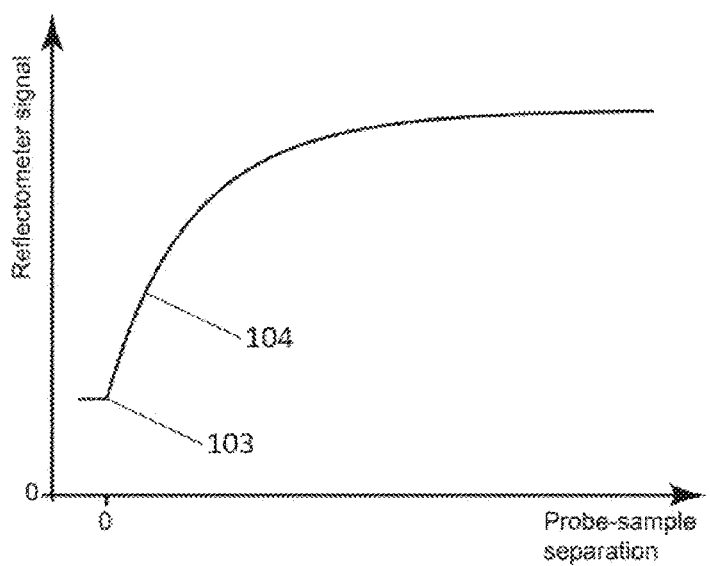
FIG. 10 is the typical reflectometer signal as a function of the separation distance between the probe tip and sample surface. The reference marks represent: (103)—point corresponding to a tip-sample contact; (104)—point where the tip is separated from the sample surface.

Since the probes (17) cannot be manufactured with a sub-100 nm tolerance of the tip (18) length (the tolerance can be as large as about +/−10 µm), said length for the tip (18) needs to be determined for each probe (17) with a separate procedure after installation of the probe (17) into the microscope. The value of A obtained from the signal of the confocal sensor (1) does not have a distinct feature associated with the contact between the probe tip (18) and the sample (7) surface. The signal of the reflectometer (5) can be utilized for this purpose (FIG. 10). The reflectometer (5) signal has a very distinct change in the behavior as a function of tip-sample separation at the point (103) corresponding to the tip-sample contact. The coarse setting of the tip-sample distance can be accomplished by setting the tip-sample distance under monitoring the signal of the confocal sensor (1) (FIG. 9).

The fine positioning of the probe tip (18) along the plane normal to the sample's plane (Z-axis) is performed after that by moving the probe holder assembly (8) with the help of the linear stage (6) down to the contact tip (18) with the sample (7) surface, while monitoring the signal from the reflectometer (5) and/or the confocal sensor (1). This procedure may assume bringing the probe tip (18) into a gentle contact with the sample (7) surface and needed to be performed at one-to-three points for each sample. While contacting the sample (7) with the probe (17) may cause some wear of the probe tip (18), such a wear is insignificant with the wear and damage that are a result of imaging with the probe (17) constantly in contact with the sample (7) surface.

The reflectometer (5) signal can be measured as a function of the separation between tip (18) and sample (7), and the resulting dataset can be used for setting the tip-sample separation, provided that the electrical properties of the sample are the same, for example, over identical features on the sample.

Additional stages for the sample motion, which are not shown in FIG. 1, along the Z-axis and sample rotation around the Z-axis can be added straightforwardly for optimization of the mapping process and increase of the fidelity of the measurement results. As an example, with the presence of the Z linear stage for the sample, the motion of the cantilever arm (17') can be replaced with the Z-motion of the sample (7) in the algorithm described above. If the sample can be finely positioned along the vertical direction (Z-axis), the Z-motion of the cantilever arm (17') and of the confocal sensor (1) can be excluded from the algorithms above; Z-positions of the cantilever arm (17') and the confocal sensor (1) can be tuned once and then fixed.

Generally, a systematic tilt of the sample (7) surface can be expected, that is, the plane of the sample (7) surface is not parallel to the top plane of the sample (7) stage where the sample is placed. Therefore, moving the sample (7) stage will move the probe tip (18) along a plane, which is not parallel to the sample (7) surface in the reference system of the sample. Depending on the tilt (non-parallelism) value as well as the required accuracy and fidelity of the measurement, two approaches can be applied to account for the tilt. One is to set the probe (17) at a distance from the sample (7) surface at one point along the sample (7) surface (within the scanning frame) and move (scan) the sample (7) for measurements after that. The tilt can be accounted for by subtracting a plane from the acquired map. This is a standard function in scanning probe measurements. Such an approach can be used if the tilt is relatively small. With the second approach, the probe (17) is moved along the Z-axis synchronously with the raster-scan motion of the sample (7) so that the probe (17) remains at a fixed distance from the sample (7) surface. To realize this approach, the Z-position of the sample (7) surface in the laboratory reference system needs to be determined at least at three points within the scan frame. It can be done with the use of the confocal sensor (1) alone, or with a combination of the algorithm described above and the microwave signal. As another possibility, the sample (7) surface tilt can be removed after such measurements with the help of rotational stages allowing sample rotation around axes normal and parallel to its surface that are installed together with the linear translation stages (9) and (10).

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

REFERENCES

[1] A. Imtiaz and S. M. Anlage, "*A novel stm-assisted microwave microscope with capacitance and loss imaging capability*", Ultramicroscopy 94, 209-216 (2003).

The invention claimed is:

1. A near-field microwave microscope, comprising:
a control and signal acquisition unit (32);
a sample motion stage (7);
a microwave probe holder assembly (8) comprising at least a probe (17); the probe (17) having a tip (18) with a sharp apex positioned in a near vicinity of the sample (7) surface;
an optical chromatic confocal displacement sensor (1), having an aperture and being positioned with its optical axis along a plane normal to the plane of the sample (7) surface; the sensor (1) further comprises:
an optical unit adapted to focus a light spot (20) of different wavelengths at different positions along its optical axis, simultaneously on a portion of the probe (17) and on a portion of the sample (7) surface; and
a spectrometer unit adapted to measure the intensity of the spot light reflection signal as a function of the light wavelength; such intensity signal yielding a peaked intensity (101), (102) of light at a sensor (1) position along the optical axis for each reflecting surface, that is, corresponding to a distance between the sensor (1) aperture and the probe (17), $Z_p$, and to the distance between the sensor (1) aperture and the sample (7) surface, $Z_s$; wherein,
the control and signal acquisition unit (32) comprising processing means configured to position and monitor the position of the probe tip (18) at a predefined distance, $A=Z_p-Z_s$, from the sample (7) surface, based on a tip length and the distance values $Z_p$ and $Z_s$.

2. Microscope, according to claim 1, further comprising:
a microwave reflectometer (5) configured to measure a microwave reflection coefficient of the microwave from the probe (17); the assembly (8) being attached to the reflectometer (5);
the probe holder assembly (8) further comprises a transmission line structure; and the probe (17) being connected to the transmission-line structure, such that the probe (17), the transmission-line structure and the reflectometer (5) forms a single mechanical assembly; wherein,
the control and signal acquisition unit (32) is configured to determine the length of the tip (18) based on the reflection coefficient measure by the reflectometer (5).

3. Microscope according to claim 2, further comprising:
a plurality of positioners (26), (28), (29) configured to provide translation movements to the sample (7), to the sensor (1) and to the mechanical assembly formed by the probe holder assembly (8), the transmission-line structure and the reflectometer (5);
the positioners (26), (28), (29) being actuated by the control and signal acquisition unit (32).

4. Microscope according to claim 3, wherein
a positioner (26) is configured to move the sensor (1) along a sample's plane and along a plane normal to a sample's plane;
a positioner (29) is configured to move the mechanical assembly formed by the probe holder assembly (8), the transmission-line structure and the reflectometer (5) along a plane normal to a sample's plane; and
a positioner (28) is configured to move the sample (7) along a sample's plane.

5. Microscope according to claim 4, wherein a positioner comprises at least one linear translation stage (2), (3), (4), (6), (9), (10) and a respective controller; and wherein,
the distance between the sample (7) surface and the sensor (1) aperture, and the distance between the sample (7) surface and the tip (18), is fine-tuned by means of a set of linear translation stages (4), (6) adapted to move along a plane normal to a sample's plane;
the position of sensor (1) in respect to the cantilever arm (17') of the probe (17) is set by means of a set of linear translation stages (2), (3), adapted to move along a sample's plane;
the sample (7) is moved by means of a set of linear translation stages (9), (10) adapted to move along a sample's plane.

6. Microscope according to claim 5, wherein the sensor (1) is positioned in respect of the cantilever arm (17') of the probe (17) so that:
the spot light (20) from the sensor (1) focuses an area close to the distal end of cantilever arm (17'); and
a part of the spot light (20) focuses the cantilever arm (17'); and the other part of the spot light (20) focuses the sample (7) surface;
preferably, the spot light (20) from the sensor (1) is divided approximately equally between the cantilever arm of the probe (17) and the sample (7) surface.

7. Microscope according to claim 2, wherein the reflectometer (5) comprises:
a synthesized microwave source (21) configured to generate a probing microwave;
a coupler (22) adapted to sample forward and reflected microwaves; and
a receiver (23).

8. Microscope according to claim 7, wherein
the reflectometer (5) is of a homodyne type, and the receiver (23) is configured to measure the magnitude of the reflection coefficient based on the detection of the forward and reflected microwaves' magnitude; or
the reflectometer (5) is of a heterodyne type, and the receiver (23) is configured to measure the magnitude and phase of the reflection coefficient based on the detection of the forward and reflected microwaves' magnitude and phase.

9. Microscope according to claim 1, wherein the length of the tip (18) is in the range of 100-150 µm or sufficiently long so that the peaks (101) and (102) are well-resolved and do not overlap.

10. Microscope according to claim 1, wherein
the probe (17) has an L-shape, being comprised by a cantilever arm and the tip (18) being position at a distal end of a cantilever arm's first portion (17'); and
the probe holder assembly (8) further comprising a dielectric substrate (16), the transmission-line structure being formed on the substrate (16); a second portion of the cantilever arm (17") being connected to a signal conductor (19) of the transmission-line structure; and
the cantilever arm (17', 17") and the tip (18) forming a single electrically conducting body.

11. Microscope according to claim 10, wherein
the first portion of the cantilever arm (17') makes an angle in the range of 10-15 degrees with the sample (7) surface; and
the tip (18) axis is approximately normal to the sample (7) surface.

12. Microscope according to claim 10, wherein the probe holder assembly (8) further comprises:
a body (24);
a coaxial connector (12);
an air-filed coaxial waveguide (14) inserted into the body (24), and connecting the coaxial connector (12) at a first end by means of an impedance matching element (13); and wherein,
the probe (17) is electrically connected to a second end of the coaxial waveguide (14), opposite to the first end, preferably by means of wire bonding (15);
the substrate (16) is fixed to the body (24).

13. Microscope according to claim 1, further comprising:
a microwave reflectometer (5) configured to measure a microwave reflection coefficient of the microwave from the probe (17); the assembly (8) being attached to the reflectometer (5);
the probe holder assembly (8) further comprises a transmission line structure; and the probe (17) being connected to the transmission-line structure, such that the probe (17), the transmission-line structure and the reflectometer (5) forms a single mechanical assembly; wherein,
the control and signal acquisition unit (32) is configured to determine the length of the tip (18) based on the reflection coefficient measure by the reflectometer (5); and wherein the probe holder assembly (8) further comprises:
a body (24);
a coaxial connector (12);
an air-filed coaxial waveguide (14) inserted into the body (24), and connecting the coaxial connector (12) at a first end by means of an impedance matching element (13); and wherein,
the probe (17) is electrically connected to a second end of the coaxial waveguide (14), opposite to the first end, preferably by means of wire bonding (15);
the substrate (16) is fixed to the body (24); and wherein the measurement of the microwave reflection coefficient at the probe holder assembly (8), provided by the reflectometer (5), is performed:

at the element (13); the element (13) being configured to provide capacitive coupling between the element (13) and the coaxial waveguide (14); or
at the probe (17); the element (13) being firmly in electrical contact with the coaxial waveguide (14).

14. A method for positioning a tip (18) of a microwave probe (17) at a predefined distance, A, from a sample (7) surface, in a hybrid near-field scanning microwave microscope; the microscope having a probe holder assembly (8) comprised by the probe (17) having a cantilever arm (17') on a distal end of which the tip (18) of a known length is positioned; the method comprising the steps of:
  i. scanning a confocal sensor (1) over a cantilever arm (17') and a sample (7) surface, to determine an optimal position for the sensor (1), in which an optical axis of the sensor (1) intercepts both a portion of the cantilever arm (17') and a portion of the sample (7) surface;
  ii. actuating the sensor (1) to focus a light spot (20) of different wavelengths at different positions along the optical axis of the sensor (1);
  iii. measuring the intensity of the light reflected from both the surfaces of the cantilever arm (17') and the sample (7), by the sensor (1), as a function of the light wavelength, in order to determine an intensity peak (101), (102) for each reflected surface's signal;
  iv. modeling the peak (101), corresponding to a maximum of a sample (7) peak, using a modeling function in order to obtain a function $F_s(z)$ and to determine at least one modeling parameter relating to a distance $Z_s$ corresponding to a distance between the sample (7) surface and the confocal sensor (1) aperture;
  v. modeling the peak (102), corresponding to a maximum of a cantilever arm (17') peak, using a modeling function in order to obtain a function $F_p(z)$ and to determine at least one modeling parameter relating to a distance $Z_p$ corresponding to a distance between the cantilever arm (17') and the sensor (1) aperture;
  vi. moving the probe holder assembly (8) towards the sample (7) surface and simultaneously modeling a full sensor (1) intensity signal with a sum of functions $F_s(z)$ and $F_p(z)$, wherein the parameters of function $F_s(z)$, $Z_s$, are fixed and the parameters of function $F_p(z)$, $Z_p$, vary in order to achieve the predetermined distance, A, between the sample (7) surface and the cantilever arm (17'), during the assembly (8) motion, wherein $A=Z_p-Z_s$;
  vii. stopping the assembly (8) motion at the predefined value of difference A.

15. Method according to claim 14, wherein, prior to the step i., the following steps are executed:
lifting a probe (17) to a height so that the sample (7) surface is below the probe tip (18) with a predefined tip-sample gap separating the probe cantilever arm (17') and the sample (7) surface;
fixing a distance between a confocal sensor (1) aperture and sample (7) surface within a working distance range of the sensor (1), by moving the sensor (1) along a plane normal to the sample's plane;
moving the confocal sensor (1) to introduce the cantilever arm (17') into a light spot (20) of the sensor (1); and
moving the cantilever arm (17') down to the sample (7) surface to a predefined range distance between tip (18) and sample (7).

16. The method according to claim 15, wherein the initial tip-sample gap is relatively large, e.g., 1 mm.

17. The method according to claim 15, wherein the predefined range distance between cantilever arm (17') and sample (7) is 100 to 300 μm.

18. Method according to claim 14, wherein determining the optimal position of the sensor (1) in relation to the cantilever arm (17'), in step i., comprises:
- positioning the light spot (20) close to a distal end of the cantilever arm (17'), such that a part of the light spot (20) area focuses on the cantilever arm (17') and the other part of the light spot (20) area focuses the sample (7) surface.

19. Method according to claim 18, wherein the spot light (20) from the sensor (1) is divided approximately equally between the cantilever arm (17') and the sample (7) surface.

20. Method according to claim 14, wherein modeling the obtained intensity signal, in steps iv. and v., is implemented using a mathematical function, preferably a Lorentzian or a Gauss function.

21. Method according to claim 14, wherein the modeling function used to model peak (101), in step iv., is the same as the one used to model peak (102), in step v.

22. The method according to claim 14, wherein the movement of the probe (17), the sensor (1) and the sample (7) is executed by means of linear translation stages.

\* \* \* \* \*